United States Patent
Cheng et al.

(10) Patent No.: US 8,340,234 B1
(45) Date of Patent: Dec. 25, 2012

(54) SYSTEM AND METHOD FOR ISI BASED ADAPTIVE WINDOW SYNCHRONIZATION

(75) Inventors: Hao-ren Cheng, Miaoli County (TW); Chih-yuan Chu, Hsinchu (TW)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 12/496,040

(22) Filed: Jul. 1, 2009

(51) Int. Cl.
H03D 1/06 (2006.01)
H03D 11/04 (2006.01)
H03K 5/01 (2006.01)
H03K 6/04 (2006.01)
H04B 1/10 (2006.01)
H04L 1/00 (2006.01)
H04L 25/08 (2006.01)

(52) U.S. Cl. ....................................... 375/348

(58) Field of Classification Search .................. 375/259, 375/260, 267, 340, 343, 346, 348, 355; 370/206, 370/208, 210, 281, 343
See application file for complete search history.

(56) References Cited

U.S. PATENT DOCUMENTS

| | | | |
|---|---|---|---|
| 2004/0046689 A1* | 3/2004 | Rees et al. | 342/159 |
| 2006/0239367 A1* | 10/2006 | Wilhelmsson et al. | 375/260 |
| 2008/0304587 A1* | 12/2008 | Setoh et al. | 375/260 |
| 2009/0097576 A1* | 4/2009 | Adachi et al. | 375/260 |
| 2010/0074348 A1* | 3/2010 | Xu | 375/260 |
| 2010/0158170 A1* | 6/2010 | Li et al. | 375/346 |

OTHER PUBLICATIONS

U.S. Appl. No. 12/272,629, filed Nov. 17, 2008.
U.S. Appl. No. 12/277,247, filed Nov. 24, 2008.
U.S. Appl. No. 12/277,258, filed Nov. 24, 2008.
U.S. Appl. No. 12/365,726, filed Feb. 4, 2009.
U.S. Appl. No. 12/398,952, filed Mar. 5, 2009.

* cited by examiner

*Primary Examiner* — David C. Payne
*Assistant Examiner* — Syed Haider
(74) *Attorney, Agent, or Firm* — Bay Area Technology Law Group PC (57) ABSTRACT

This disclosure is directed to systems and methods for positioning a FFT window using the noise power that is related to ISI By selecting a FFT window position that minimizes the noise power, ISI is reduced or eliminated The techniques can be used in coherent and non-coherent systems Further, noise associated with the Doppler effect is compensated for, allowing the use of these system and methods in time-varying environments, such as mobile applications.

19 Claims, 7 Drawing Sheets

SYSTEM AND METHOD FOR ISI BASED ADAPTIVE WINDOW SYNCHRONIZATION

FIELD OF THE PRESENT INVENTION

The present invention relates to multiple carrier wireless communication systems in general, and more specifically, to adaptive FFT window synchronization in wireless OFDM systems

BACKGROUND OF THE INVENTION

Advanced multimedia services continue to drive requirements for increasing data rates and higher performance in wireless systems. Current technologies for high performance communication systems, such as those specified by the European terrestrial digital video broadcasting (DVB-T) standard, the Japanese integrated services digital broadcasting terrestrial standard (ISDB-T) and the digital audio broadcasting (DAB) standard, employ communication methods based on Orthogonal Frequency Division Multiplexing (OFDM)

As known to those of skill in the art, multipath interference presents a significant impediment to effective wireless communication Due to different length transmission routes, multiple versions of a transmitted data signal arrive at a receiver with different delays. These variable transmission times can result in inter-symbol interference (ISI) when the different data signals arrive at the receiver simultaneously.

In OFDM multiple sub-carrier systems, a higher rate data signal is divided among multiple narrowband sub-carriers that are orthogonal to one another in the frequency domain Two signals are orthogonal if their dot product is equal to zero Thus, the higher rate data signal is transmitted as a set of parallel lower rate data signals carried on separate sub-carriers.

Figure 1:
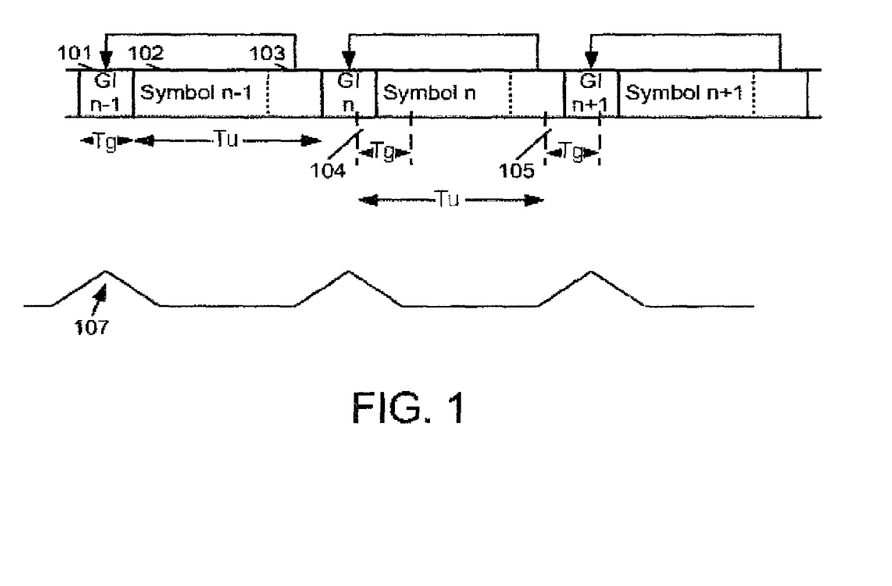
FIG. 1 schematic illustration of an OFDM symbol and GI with a corresponding autocorrelation plot.

A received OFDM symbol in an OFDM system generally consists of both data and pilot synchronization information transmitted on the multiple sub-carriers multiplexed together and spanning multiple sample periods. Modulation and demodulation in an OFDM system uses an inverse fast Fourier transform (IFFT) at the transmitter and a fast Fourier transform (FFT) at the receiver At the transmitter, a cyclic prefix of a section of the IFFT output for each OFDM symbol is typically appended to the beginning of the OFDM symbol as a guard interval (GI) The length of the OFDM symbol before adding the guard interval is known as the useful symbol period duration At the receiver, the cyclic prefix is removed prior to the FIT demodulation by the appropriate positioning of an FFT window, which has a size equal to the useful symbol period duration, along a received sample sequence Subsequently, FIT demodulation transforms the window of received time domain samples, in the received sample sequence, to a frequency domain (OFDM) symbol As shown in FIG. 1, an exemplary OFDM symbol sequence 100 includes a series of OFDM symbols, each having a useful symbol period duration $T_u$, appended by a GI of duration $T_g$ For example, GI 101 for OFDM symbol 102 appends a last portion 103 of OFDM symbol 102 at the beginning In a received sample sequence, the location of the GI and useful symbol periods is typically not known at the receiver An estimate of the location of the guard interval may be determined by correlating a first $T_g$ length segment 104 of the received sample sequence with a second $T_g$ length segment 105 separated by the useful symbol period duration $T_u$ Autocorrelation plot 107 reflects the resulting correlation that peaks when the first $T_g$ length segment 104 is positioned over GI 101. The demodulator's FIT window, having a duration $T_u$, is then positioned to pass the OFDM symbol 102, including the last portion 103, to demodulation while discarding GI 101

A principle advantage of this type of communication system is that the lower data rate occupies a longer symbol period than in a higher rate single carrier system. The addition of the GI to each lower frequency symbol contains the dispersion caused by multipath within the longer symbol period, reducing or eliminating ISI OFDM systems also offer a number of other advantages relevant to wireless applications, including high spectral efficiency and the ability to compensate for poor channel conditions, including signal fade Further details regarding OFDM systems can be found in co-pending, commonly-assigned U.S. patent application Ser. Nos. 12/272,629, filed Nov. 17, 2008, Ser. No. 12/277,247, filed Nov. 24, 2008, Ser. No. 12/277,258, filed Nov. 24, 2008, Ser. No. 12/365,726, filed Feb. 4, 2009, Ser. No. 12/398,952, filed Mar. 5, 2009, and Ser. No. 12/512,273, filed Jul. 30, 2009 {"System and Method for reducing phase errors in multiple sub-carrier communication systems" by Inventors Hao-Ren Cheng, Kuang-Chung Ou, William McFarland}, all of which are hereby incorporated by reference in their entirety As will be appreciated, the performance of an OFDM system depends upon the appropriate positioning of the FFT, so that the portion of the signal corresponding to the OFDM symbol is passed on, while the GI is discarded In a multipath environment or in single frequency networks (SFN), such as DVB-T and ISDB-T, multiple, superimposed copies of a sequence of transmitted OFDM symbols arrive simultaneously Correspondingly, each copy of the sequence of transmitted OFDM symbols typically incurs a different time delay and is scaled in amplitude by a different gain.

The GI discussed above adds flexibility to the positioning of the demodulation FIT window to minimize or eliminate ISI and thereby improve performance. For example, if a maximum delay spread between the beginning of the earliest received copy of an OFDM symbol and the beginning of the latest received copy of the same OFDM symbol is less than the length of the GI, the FFT window can be positioned to eliminate ISI Alternatively, if the maximum delay spread is greater than the length of the GI, ISI is not eliminated, but the FIT window may be positioned to minimize the interference. Accordingly, the FFT window must be placed accurately if ISI is to be eliminated or minimized Prior art methods for positioning the FIT window include strongest signal correlation, first signal above threshold and center of gravity. Samples spaced by an interval corresponding to the useful signal length are taken and compared to generate a correlation signal. As discussed above, a plurality of signals are available to the receiver in a multipath environment or a SFN system The strongest signal technique simply correlates peaks in the strongest received signal to position the FFT window for all the signals The first signal above threshold technique correlates to the first received signal that has sufficient strength. Finally, the center of gravity technique essentially "averages" the received signals and correlates to the imputed center. Unfortunately, none of these techniques work particularly well for a SFN system Another prior art technique positions the FFT window to maximize the carrier-to-noise ratio (C/I). However, this solution does not provide a satisfactory method for determining signal arrival time. Other prior art techniques use channel estimation information to position the FFT window. Correspondingly, these cannot be applied in communication systems that do not provide scattered pilot symbols, such as DAB and non-coherent ISDB-T Yet other techniques position the FFT window based on computed bit error rates (BER) Such techniques suffer from a long delay between FFT window selection and the corresponding BER determination, particularly when the communication system employs time interleaving Thus, BER-based methods do not offer optimized performance, particularly under rapidly changing conditions such as mobile applications.

Accordingly, it would be desirable to provide systems and methods that position the FFT window to minimize or eliminate ISI, even in multipath environments or SFN systems. Similarly, it would be desirable to provide such systems and methods that do not require channel estimation using scattered pilots and can rapidly provide feedback to optimize window position and improve performance, even under quickly-changing conditions

SUMMARY OF THE INVENTION

In accordance with the above needs and those that will be mentioned and will become apparent below, this disclosure is directed to a method for reducing inter-symbol interference in a multiple sub-carrier digital communication receiver comprising the steps of selecting a plurality of transform window positions, transforming a sequence of time domain samples into a sequence of frequency domain symbols, each frequency domain symbol including a plurality of complex values at a plurality of sub-carrier frequencies, using each of the plurality of transform window positions, calculating a noise power associated with each of the plurality of transform window positions, and determining an optimized transform window position using the calculated noise powers. Preferably, the step of calculating noise power comprises compensating for inter-channel interference, such as by compensating for inter-channel interference comprises reducing noise associated with Doppler spread using a high-pass filter. Also preferably, the step of calculating a noise power associated with each of the plurality of transform window positions comprises accumulating noise power over a plurality of frequency domain symbols.

In one embodiment configured for non-coherent systems, the step of determining an optimized transform window position comprises the steps of determining an initial transform window position by coarse synchronization and employing the initial transform window position as a working transform window position, calculating a first noise power associated with a first transform window position associated with a first path, calculating a second noise power associated with a second transform window position associated with a last path, and revising the initial transform window position by advancing a start point if the second noise power less the first noise power is greater than a threshold value and by retarding the start point if the second noise power less the first noise power is less than the negative of the threshold value. Preferably, such an embodiment further comprises the step of repeating the noise power calculations using successively revised transform window positions until the magnitude of the difference between the first noise power and second noise power is less than the threshold value In another embodiment configured for coherent systems, the method further comprises the step of estimating a channel impulse response from a plurality of pilot symbols and the step of selecting the plurality of transform window positions includes using information from the estimated channel impulse response. Preferably, the estimated channel impulse response determines a first path and a last path and wherein the plurality of transform window positions comprise a first transform window position with a start point coinciding with a start of a frequency domain symbol on the first path, a second transform window position with a start point coinciding with a start of a frequency domain symbol on the second path, a third transform window position with a start point coinciding with a path immediately preceding the first path; a fourth transform position with a start point preceding the first transform window position by a time corresponding to a guard interval and a fifth transform position with a start point preceding the second transform window position by a time corresponding to a guard interval.

This disclosure is also directed to an apparatus in a multiple sub-carrier digital communication receiver comprising a symbol synchronization block configured to calculate a noise power associated with each of a plurality of transform window positions and determine an optimized transform window position using the calculated noise powers and a transform block configured to transform a sequence of time domain samples into a sequence of frequency domain symbols, each frequency domain symbol including a plurality of complex values at a plurality of sub-carrier frequencies, using the optimized transform window position In one embodiment, the symbol synchronization block comprises a plurality of parallel noise detector modules.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which.

DETAILED DESCRIPTION OF THE INVENTION

As discussed above, the techniques used to position an FFT window directly affect the performance of an OFDM since incorrect positioning will result in ISI This disclosure is directed to systems and methods that optimize the positioning of the FIT window by finding the positioning that results in the minimum noise power of the received signal. Such techniques provide a much shorter reaction time than conventional approaches, such as BER-based methods As will be described below, the noise power calculations do not require channel estimation and can work in both non-coherent and coherent systems. The systems and methods of this disclosure employ a high-pass filter to minimize the Doppler effect, allowing the techniques to be used in time-varying environments, such as those associated with mobile applications At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

Figure 2:
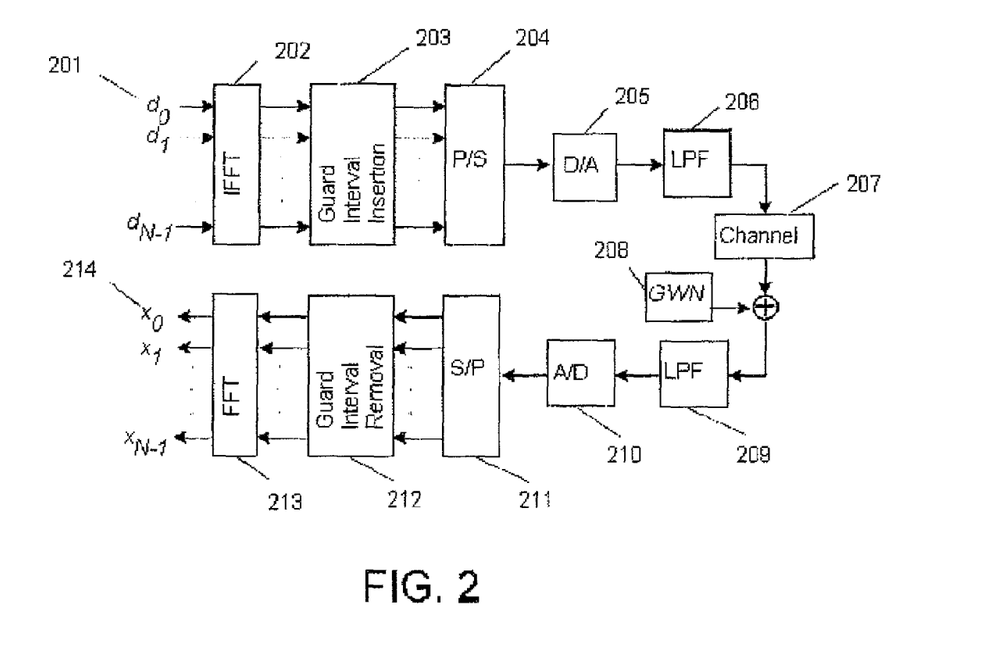
FIG. 2 is a schematic illustration of functional aspects of an OFDM receiver.

FIG. 2 provides a schematic example of the functional blocks of the baseband of an OFDM system relevant to this disclosure Specifically, a plurality of frequency domain data symbol sequences $d_0$-$d_{N-1}$ 201 are fed through an IFFT block 202 and converted into time domain data sample sequences Each OFDM symbol is appended with a cyclic prefix providing the GI in block 203. The parallel streams are combined into a serial stream in block 204 and then converted by digital-to-analog converter block 205 A low-pass filter 206 processes the signal before being modulated onto the frequency channel in block 207. Transmission and reception of the signal leads to the addition of Gaussian white noise 208. The remainder of the process generally follows the inverse of the above steps Low pass filter 209 processes the signal before being passed to the analog-to-digital converter block 210 The resulting digital stream is then recomposed into its constituent parallel streams by converter 211. The GI is removed in block 212 so that the only the portion of the signal corresponding to the OFDM symbols are fed to FFT block 213, where they are subsequently converted into received frequency domain data symbol sequences $x_0$-$x_{N-1}$ 214, corresponding to data symbol sequences 201.

This disclosure is primarily concerned with the operation of block 212, which requires the accurate placement of the FFT window to effectively remove the GI from the OFDM symbols while eliminating or minimizing ISI. As referenced above, sub-optimal positioning of the FFT window leads to the inclusion of some portion of an adjacent OFDM symbol and leads to ISI.

Figure 3:
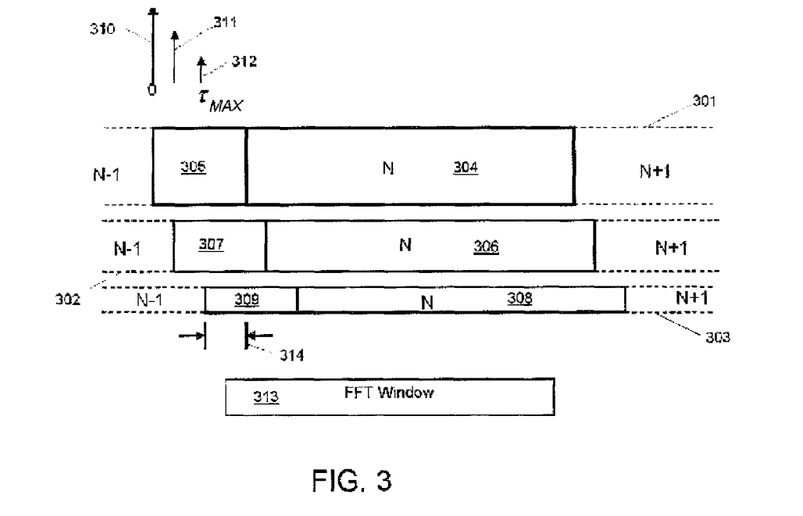
FIG. 3 is a schematic illustration of three received signals having a sequence of OFDM symbols showing the effect of FFT window position on ISI.

This goal is graphically depicted in FIG. 3, which shows three signals 301, 302 and 303 carrying the same adjacent OFDM symbols N−1, N, and N+1. The x-axis of FIG. 3 is time, so it can be seen that each signal has a different delay associated with it that causes the OFDM symbols to arrive at different, overlapping times The y-axis indicates the relative gain of each signal. As described above, each OFDM signal has a GI appended to the beginning of the symbol, so that symbol N 304 on signal 301 has GI 305, symbol N 306 on signal 302 has GI 307, and symbol N 308 on signal 303 has GI 309 The CIR of each signal is graphically represented by arrows 310, 311 and 312, which correspond to signal 301, 302 and 303, respectively The size of each arrow represents the gain of the corresponding signal and each arrow coincides with the start of the GI of the received symbol on each signal. The value $\tau_{MAX}$ represents the delay spread between the first-arriving signal 301 and the last-arriving signal 303

Provided the delay spread of the signals is sufficiently low, HT window 313, having a length corresponding to the useful length of the OFDM symbol, can be positioned so that it begins anywhere within a range 314 without resulting ISI. However, if the FFT window 313 were positioned so that it began after range 314, it can be seen that FFT window 313 would extend beyond symbol 304 on signal 301, allowing some of the N+1 symbol to pass to the FFT. Likewise, if the FFT window 313 were positioned to begin before range 314, a portion of the N−1 symbol from signal 303 would be included Both of these situations result in ISI and degrade the performance of the OFDM receiver Alternatively, if $\tau_{MAX}$ exceeds the GI, then ISI cannot be completely eliminated. However, in such situations, ISI can still be minimized to facilitate the best OFDM receiver performance possible under the conditions. This disclosure is directed to systems and methods that optimize the positioning of the FFT window by finding the positioning that results in the minimum noise power of the received signal.

An example of the FFT operation where ISI and ICI disturbances are modeled as an additional noise term $n_{n_\epsilon;l,k}$ is given by $$z_{l,k} = e^{j2\pi(k/N)n_\epsilon} \alpha(n_\epsilon) A_{l,k} H_{l,k} + n_{l,k} + n_{n_\epsilon;l,k} \quad (1)$$

in which N is the FFT length, l denotes the OFDM symbol time index, k denotes the sub-carrier frequency index, $z_{l,k}$ is the post-FFT data, $a_{l,k}$ is the transmitting data, $H_{l,k}$ is the channel transfer function and $n_{l,k}$ is the white Gaussian noise Further, the $\alpha(n_\epsilon)$ term is given by $$\alpha(n_\epsilon) = \sum_i |h_i(t)|^2 \frac{N - n_{\epsilon i}}{N} \quad (2)$$

in which $n_{\epsilon i}$ is the symbol timing offset of the i-th path

As can be appreciated by one of skill in the art, equations (1) and (2) indicate that the noise power is proportional to the symbol timing offset. In other words, a larger symbol timing offset results in a larger noise power. This is the basis for the FFT window positioning strategies in this disclosure By selecting the FFT window to minimize noise power, ISI will likewise be minimized.

Figure 4:
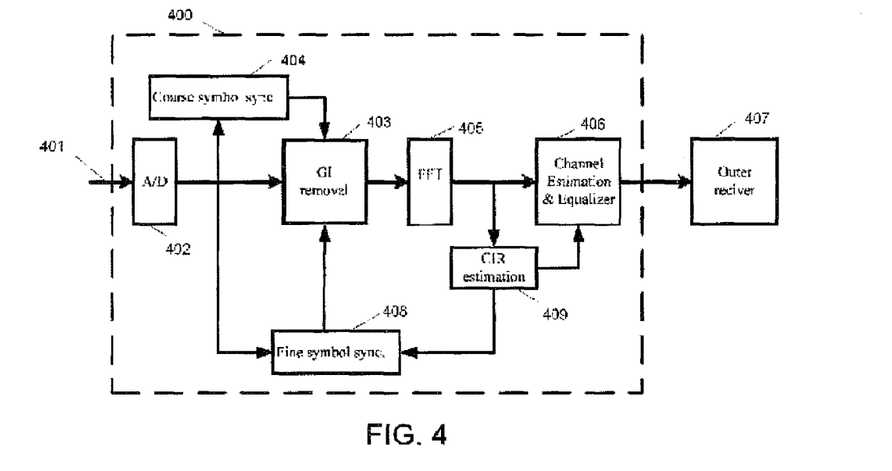
FIG. 4 is a schematic illustration of the functional blocks of an apparatus for optimizing FFT window position by minimizing noise power associated with ISI, according to the invention.
Figure 5:
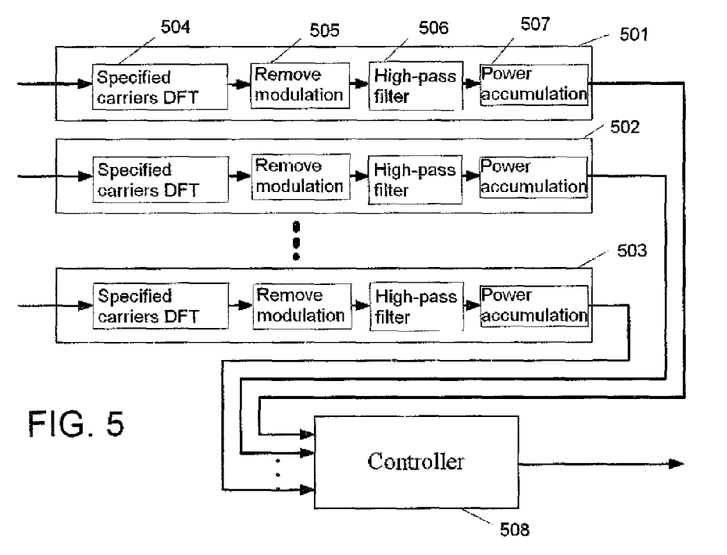
FIG. 5 is a schematic illustration of the functional blocks of the noise detection used to provide fine synchronization, according to the invention.

However, since equation (1) also includes noise due to ICI, such as from a time-varying mobile channel, it is preferable to exclude this from the calculation of noise power. Noise due to ICI can be approximated with an estimated maximum Doppler frequency $f_{Dmax}$ as $$\frac{E\{z_{l,k} \cdot z^*_{l+\Delta l,k}\}}{E\{|z_{l,k}|^2\}} = J_0(2\pi \cdot f_{Dmax} \cdot \Delta l \cdot T_S) \quad (3)$$

in which the difference hi OFDM symbol number is given by $\Delta l$, $T_s$ is the duration of an OFDM symbol, including GI, and $J_0(x)$ is the 0-th order Bessel function of the first kind. Further details regarding the estimation of Doppler frequency and associated ICI can be found in U.S. patent application Ser. No. 12/277,247, filed Nov. 24, 2008, which has been incorporated by reference above. As will be appreciated, a suitably-configured high pass filter can be used to remove the ICI noise associated with Doppler spread, white noise and additional noise to maximize the correlation of calculated noise power with ISI Accordingly, the concepts of this disclosure can be integrated into the functional design of a wireless receiver to provide an enhanced routine for determining positioning for the FFT window that minimizes or eliminates ISI. An example of such an implementation is given in FIG. 4 which schematically illustrates the functional blocks of a wireless receiver As shown, FFT window positioning and GI removal is performed by within an inner receiver functional group 400 generally responsible for OFDM demodulation and channel estimation An RF signal 401 is converted to a digital stream by analog-digital converter 402. The GI is removed in block 403 based on the determined FFT window position Initially, FFT window positioning is driven by coarse symbol synchronization in block 404 Coarse synchronization can be accomplished using any suitable known technique, such as a simple correlation algorithm, as described above, or a more complex maximum likelihood (ML) or minimum mean squared error (MMSE) algorithm and will depend upon an analysis of the digital signal stream as shown. After GI removal, OFDM symbols are delivered to block 405 for FFT Following transformation, block 406 provides channel estimation and equalization before the signal is passed on to outer receiver block 407 where additional signal processing for symbol demapping and forward error correction (FEC) occurs, such as Viterbi and Reed-Solomon decoding. Block 408 performs the fine symbol synchronization comprising positioning the FFT window to minimize noise power associated with ISI as described above. FFT window positioning determinations made in block 408 are then fed to block 403 to provide improved GI removal. As will be discussed below, in OFDM applications employing scattered pilot symbols, block 409 estimates the channel impulse response (CIR) and feeds that information to fine synchronization block 408 to facilitate FFT window positioning Turning now to FIG. 5, a more detailed schematic of the functional routines of fine symbol synchronization block 408 is shown. Generally, the noise power associated with a given FFT window position is calculated by a series of noise detectors, 501, 502 and 503 corresponding to signals having delay #1, delay #2 to delay #M, respectively. Within each noise detector functional group, the noise power corresponding to the FFT window position is determined. For example, noise detector 501 comprises block 504 that calculates the discrete Fourier transform (DFT) for carriers $K_1, K_2, \ldots K_s$ at delay #1 according to equation (4), where $k=\{K_1, K_2, \ldots K_s\}$ $$DFT(k) = \sum_{n=0}^{N-1} x_{\#1}(n)e^{-j(2\pi/N)nk} \quad (4)$$

Figure 6:
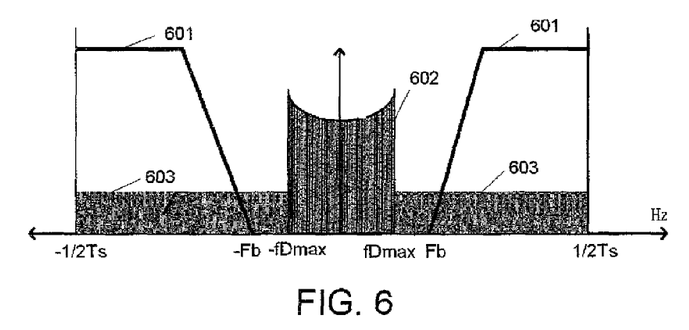
FIG. 6 is a representation of a high pass filter used to minimize noise and Doppler spread, according to the invention.
Figure 7:
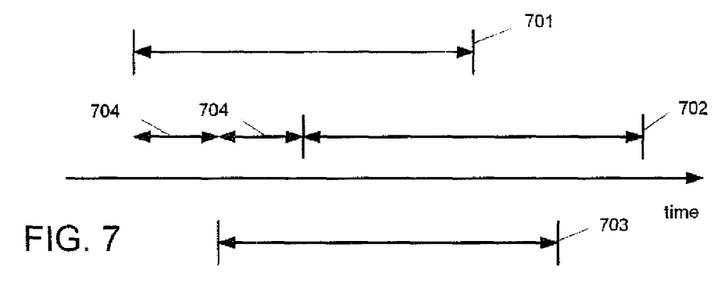
FIG. 7 is a schematic illustration of FFT window positioning in a non-coherent receiver, according to the invention.

The choice of k is preferably selected based upon the given OFDM application For example, in a system employing the DVB-T/H standard, k is chosen to correspond to carriers for the continuous pilot signals (CPS). Alternately, for ISDB-T systems, k can belong to the auxiliary channel (ACx) or the Transmission and multiplexing Configuration Control (TMCC) carriers In another embodiment, for systems using the DAB standard, k can be chosen to belong to data carriers Following DFT, block 505 removes the modulation on k, then block 506 uses a high-pass filter as described above to remove noise due to Doppler spread, white noise and additional noise, Finally, power accumulation block 507 calculates the total powers of k for an FFT window positioned at delay #1. Preferably, the values are accumulated over the span of several symbol to provide a more accurate result Finally, the results are fed to a controller in block 508 for comparison to the results of the other noise detectors 502 and 503. Finally, the optimum FFT window position is sent to GI removal block 403 as described above FIG. 6 shows a schematic example of the design of a suitable high pass filter used to remove noise and ICI due to Doppler spread. Plot 601 shows the high pass filter having a frequency cutoff at $F_b$. So long as $F_b$ is greater than $f_{Dmax}$, noise associated with Doppler spread 602 is removed. Additional noise and white noise 603 is also significantly reduced In one embodiment, an implementation of the design shown in FIGS. 4 and 5 is configured to operate in a non-coherent OFDM system, such as the ISDB-T differential standard In this embodiment, two noise detectors (M=2) are employed. A representational diagram of the corresponding FFT window positions is shown in FIG. 7, where FFT window 701 corresponds to the positioning used in noise detector #1 and FFT window 702 corresponds to the positioning used in noise detector #2 FFT window 703 shows the FFT window initially determined by coarse synchronization. As shown, FFT window 701 is positioned with a start position that is a period 704 GI/L less than FFT window 703 and FFT window 702 is positioned with a start position that is a period 704 GI/L greater than FFT window 703, where L is a design parameter that can be used to enhance the performance of a given system. As will be appreciated, preferred embodiments employ two noise detectors to account for the two possible directions in which FFT window 703 can be adjusted Each noise detector is then associated with FFT window positions flanking FFT window 703

Preferably, an iterative algorithm to optimizing the positioning of FFT window 703 is used. If the noise power associated with FFT window 702 minus the noise power associated with FFT window 701 is greater than a threshold value th, FFT window 703 is advanced by moving the start point forward by GI/P, where th and P are design parameters that can be adjusted to enhance the performance of a given system. Alternatively, if the noise power associated with FFT window 702 minus the noise power associated with FFT window 701 is less than negative th, FFT window 703 is retarded by moving the starting point backward by GI/P. If neither operation exceeds th, the current position of FFT window 703 is considered optimized and the position information is fed to block 403 for GI removal.

The value L determines the proximity of FFT windows 701 and 702, and the overall distance between the two windows is 2GI/L. Similarly, the value P controls the distance FFT window 703 is moved in each step of the iteration. In general, using a greater value for P can provide greater resolution in optimizing the positioning of FFT window 703, but may require more iterations and delay the optimization determination Further, if L is too large, it may lead to situations where the noise power detected at the corresponding FFT window positions will not be meaningfully different, interfering with the determination of which direction to move FFT window 703 Preferably, L is greater than or equal to one Also preferably, P is greater than or equal to L. As will be appreciated from the discussion above, th determines how large the differential between the noise detectors must be to justify a move in FFT window 703 Using too small a threshold value will make the algorithm too sensitive, causing the FFT window 703 to be repositioned too frequently Conversely, too large a threshold value will lead to suboptimal positioning of FFT window 703 and cause a corresponding degradation in system performance. In general, the degradation, in decibels, is equivalent to $$10\log_{10}\left(1 - \frac{th}{T_u}\right)$$

For example, in one embodiment, a suitable value for th is equal to the useful signal period $T_u$ divided by 32, resulting in a signal degradation of 0 138 dB. Other values of the can be used depending upon the application to obtain the desired results.

Figure 8A:
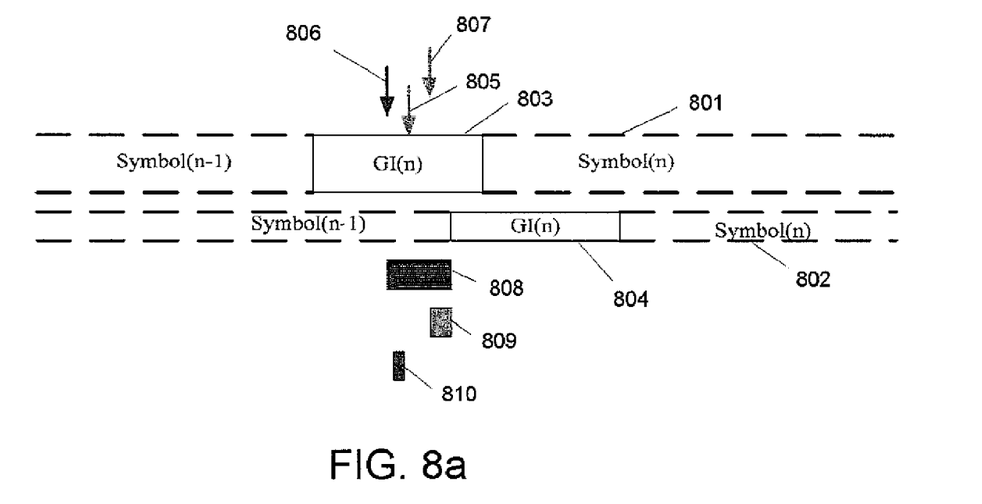
FIG. 8 is a schematic illustration of an exemplary iteration process to optimize FFT window position in a non-coherent receiver, according to the invention.

FIGS. 8a-d schematically illustrate an example of the above iterative process In FIG. 8a, two received OFDM symbol sequences (n−1), (n), arrive at different times, including OFDM symbol (n) 801 on a first path and the same OFDM symbol (n) 802 on a second, delayed and attenuated path OFDM symbols 801 and 802 include GI (n) 803 and GI (n) 804, respectively Noise detector #1 analyzes the first signal, including at least OFDM symbol 801 and noise detector #2 analyzes the second signal, including at least OFDM symbol 802. An initial FFT window start point 805 is determined using the coarse synchronization routine discussed above with respect to block 404 Similarly, noise detector #1 uses a FFT window starting at point 806 and noise detector #2 uses a FFT window starting at point 807. The ISI noise determined by noise detector #1 is graphically represented by bar 808 while the ISI noise determined by noise detector #2 is graphically represented by bar 809. Finally, the threshold value is graphically represented by bar 810 For this example, the design parameters used were L=8 and P=8

Figure 8B:
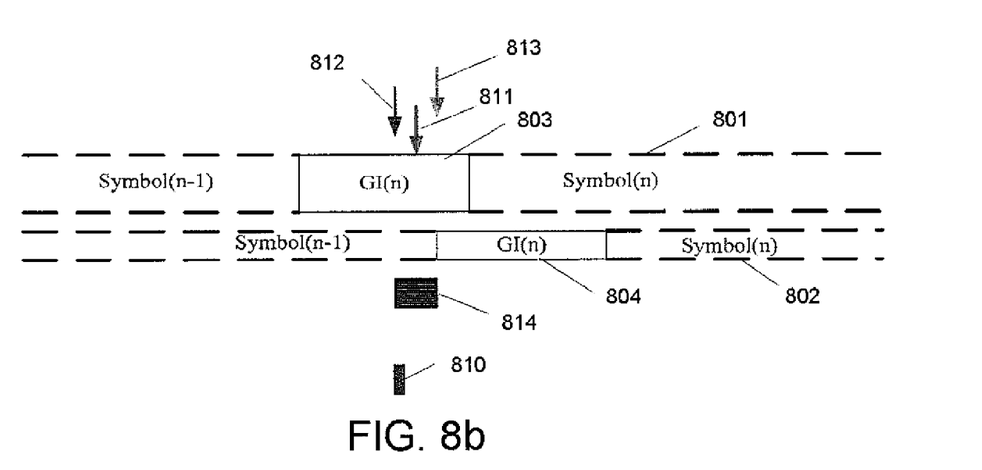

Next, FIG. 8b shows the same received symbols, but with a first refined FFT window start point 811 Since bar 809 minus bar 808 from FIG. 8a represents a negative value with a magnitude greater than threshold bar 810, start point 811 has been moved backward by GI/P, or GI/8 in this example New FFT window start positions for noise detectors #1 and #2 are shown by points 812 and 813, together with bar 814 showing the corresponding graphical representation of the ISI noise determined by detector #1. In this example, there is no ISI noise determined by noise detector #2 with respect to the FFT window starting at point 813, so no corresponding bar is shown Turning to FIG. 8c, received symbols 801 and 802 are shown along with a second refined FFT window start point 815 Since there was no ISI noise associated with noise detector #2, zero minus bar 814 from FIG. 8b represents a negative value with a magnitude greater than threshold bar 810 Accordingly, start point 815 has been moved backward from point 811 by GI/8 again. New FFT window start positions for noise detectors #1 and #2 are shown by points 816 and 817, together with bar 818 showing the corresponding graphical representation of the ISI noise determined by detector #1 Again, there is no ISI noise determined by noise detector #2 with respect to the FFT window starting at point 817, so no corresponding bar is shown.

Figure 8C:
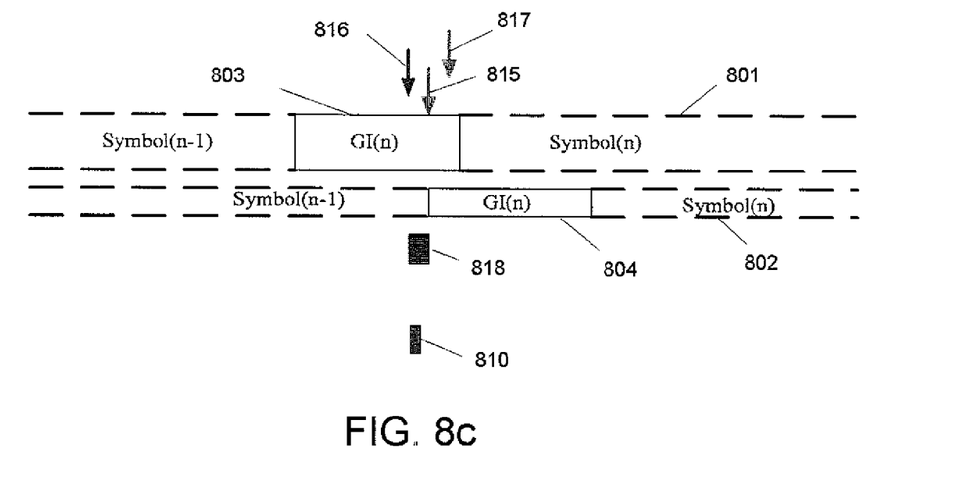
Figure 8D:
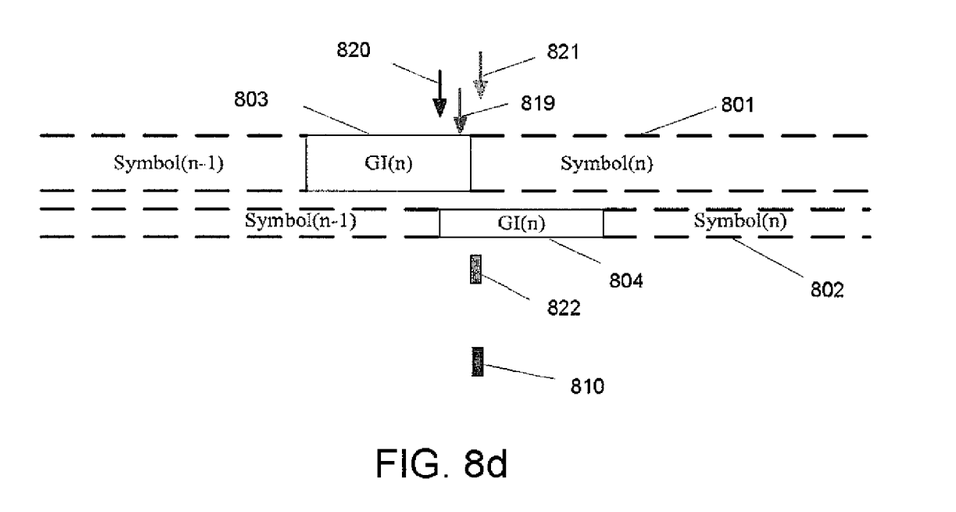

Finally, in FIG. 8d, received symbols 801 and 802 are shown along with a third refined FFT window start point 819. Since there was no ISI noise associated with noise detector #2, zero minus bar 818 from FIG. 8c represents a negative value with a magnitude greater than threshold bar 810 Accordingly, start point 819 has been moved backward from point 815 by GI/8 again. New FFT window start positions for noise detectors #1 and #2 are shown by points 820 and 821, together with bar 822 showing the corresponding graphical representation of the ISI noise determined by detector #2 In this iteration, there is no ISI noise determined by noise detector #1 with respect to the FFT window starting at point 820, so no corresponding bar is shown. Here, bar 822 minus zero represents a positive value, but is less than the threshold value represented by bar 810. Accordingly, the fine synchronization routine terminates and the FFT window position associated with start point 819 is passed to GI removal block 403.

Figure 9:
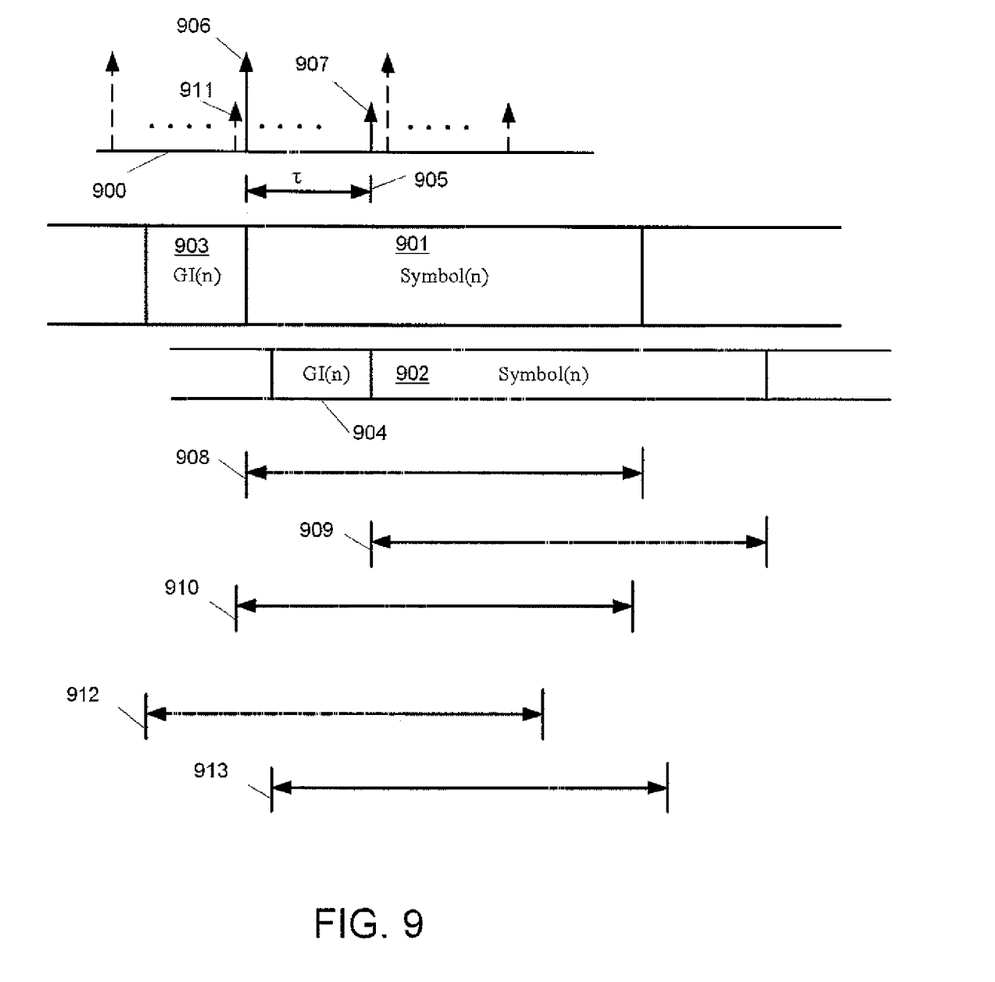
FIG. 9 is a schematic illustration of FFT window positioning in a coherent receiver, according to the invention.
Figure 10:
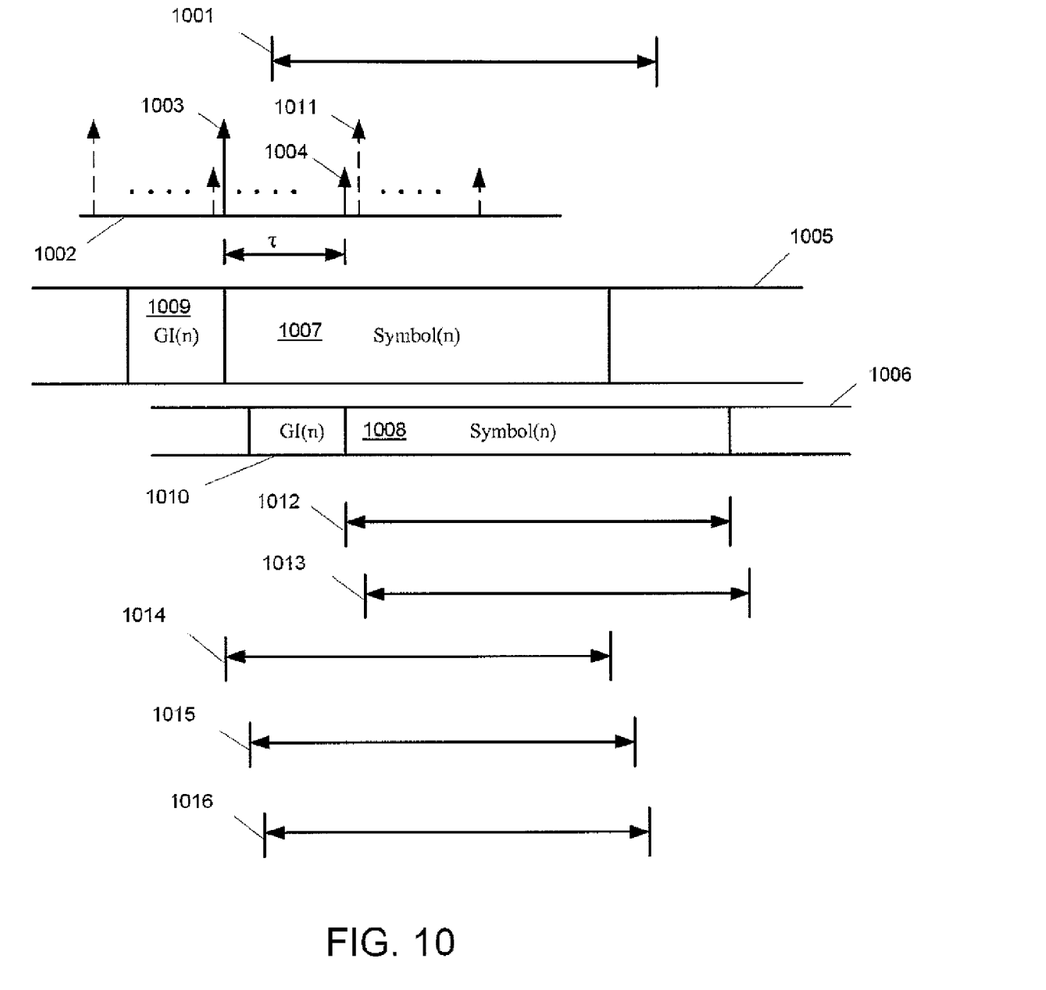
FIG. 10 is a schematic illustration of an exemplary process to optimize FFT window position in a coherent receiver, according to the invention.

In another embodiment, an implementation of the design shown in FIGS. 4 and 5 is configured to operate in a coherent OFDM system, in which pilot symbols are available. Since the pilot symbols are known, channel conditions for each sub-carrier can be interpolated, allowing CIR determination As shown above, it is preferable to use the CIR information to supplement the FFT window fine synchronization. FIG. 9 schematically illustrates five possible FFT window locations that can be determined using estimated CIR 900 Two received OFDM symbols 901 and 902, having associated GIs 903 and 904, respectively, which experience different delays are shown. As will be appreciated, the arrows graphically represent correlation peaks in CIR 900 and the size of the arrow represents the relative gain of each received signal As shown, peaks 906 and 907 coincide with the start of symbols 901 and 902. One of skill in the art will recognize that peaks 906 and 907 repeat due to the periodicity of the pilot symbols. The signal associated with symbol 901 is termed the first path because it is the earliest arriving and the signal associated with symbol 902 is the last path as it is the latest arriving The delay spread is shown as time interval τ 905 between correlation peaks 906 and 907. In this system, the optimum FFT window position is represented by the FFT window that results in the least noise power Preferably, five FFT window positions are examined. FFT window 908, with a starting point coinciding with the arrival of the start of symbol 901; FFT window 909, with a starting point coinciding with the arrival of the start of symbol 902; FFT window 910, with a starting point coinciding with the first correlation peak 911 that precedes the start of window 908; FFT window 912, with a starting point coinciding with the start of GI 903; and FFT window 913, with a starting point coinciding with the start of GI 904 The starting points for FFT windows 912 and 913 can be determined from the correlation peaks of CIR 900 by subtracting the known GI Turning now to FIG. 10, an example is given employing the above five window positions to assess the corresponding noise power associated with ISI and optimize the position of the FFT window accordingly Following the methods discussed above, an initial FFT window position 1001 is selected using coarse synchronization techniques CIR 1002 graphically represents a repeating series of correlation peaks 1003 and 1004 associated with signals 1005 and 1006, carrying symbols 1007 and 1008 with GIs 1009 and 1010, respectively In this example, CIR estimation indicates that peak 1004 is the first path and peak 1011, a repeat of peak 1003, is the last path Based upon the criteria discussed above, a series of FIT window positions are determined based upon these correlation peaks. Specifically, FIT window 1012 is positioned with a starting point coinciding with the first path, peak 1004; FFT window 1013 is positioned with a starting point coinciding with the last path, peak 1011; FIT window 1014 is positioned with a starting point coinciding with the path preceding peak 1004, peak 1003; FFT window 1015 is positioned to start at a point that precedes the first path peak 1004 by the length of the GI, (here, coinciding with the start of the GI 1010); and FFT window 1016 is positioned to start at a point that precedes the last path peak 1011 by the length of the GI. Peak 1004 is initially identified as corresponding to the first path and peak 1011 to the last path due to the position of FFT window 1001 determined by coarse synchronization Following determination of the five FFT window positions, one or more noise detectors as discussed with respect to FIG. 5 determine the noise power for each FIT window position, which reflects ISI. Controller block 508 simply selects the FFT window position that results in the lowest noise power, which in this example corresponds to FIT window 1014, and passes along the information to GI removal block 403 As will be appreciated, the number of noise detector modules in a given receiver is a design choice that will be driven by cost, complexity, performance and other concerns If five parallel noise detector modules are present, each can determine the noise power associated with a FIT window position, allowing the above routine to be performed in a single iteration Alternatively, if a single noise detector module is employed, five iterations will be required to determine the noise power for each of the five FIT window positions Described herein are presently preferred embodiments, however, one skilled in the art that pertains to the present invention will understand that the principles of this disclosure can be extended easily with appropriate modifications to other applications. For example, examples have been given regarding use with the mobile television standards ISDB-T and DVB-H, although the principles can be applied to a wide range of OFDM wireless communication standards, including other mobile television standards, including T-DMB, CMMB (STiMi) and MediaFLO forward link, as well as other digital television standards, including DVB-T, digital radio standards, including DAB/EUREKA 147, DAB+, Digital Radio Mondiale, HD Radio, T-DMB and ISDB-TSB, wireless LAN radio interthces, including IEEE 802 11a, g, n and HIPERLAN/2, cellular communication systems, including Flash-OFDM, mobile and wireless broadband systems, including HSOPA, BWA, WiMAX, Mobile WiMax, and Will°, and other wideband systems, including UWB. As such, changes and modifications are properly, equitably, and intended to be, within the full range of equivalence of the following claims.

What is claimed is:

1. A method for reducing inter-symbol interference in a multiple sub-carrier digital communication receiver comprising the steps of:
   selecting a plurality of transform window positions;
   transforming a sequence of time domain samples into a sequence of frequency domain symbols, each frequency domain symbol including a plurality of complex values at a plurality of sub-carrier frequencies, using each of the plurality of transform window positions;
   calculating a noise power proportional to a symbol timing offset and associated with each of the plurality of transform window positions; and
   determining an optimized transform window position using the calculated noise powers.

2. The method of claim 1, wherein the step of calculating noise power comprises compensating for inter-channel interference.

3. The method of claim 2, wherein the step of compensating for inter-channel interference comprises reducing noise associated with Doppler spread.

4. The method of claim 3, wherein the step of reducing noise associated with Doppler spread comprises employing a high-pass filter.

5. The method of claim 1, wherein the step of calculating a noise power associated with each of the plurality of transform window positions comprises accumulating noise power over a plurality of frequency domain symbols.

6. The method of claim 1, wherein the step of determining an optimized transform window position comprises the steps of:
   determining an initial transform window position by coarse synchronization and employing the initial transform window position as a working transform window position;
   calculating a first noise power associated with a first transform window position associated with a first path;
   calculating a second noise power associated with a second transform window position associated with a last path; and
   revising the initial transform window position by advancing a start point if the second noise power less the first noise power is greater than a threshold value and by retarding the start point if the second noise power less the first noise power is less than the negative of the threshold value.

7. The method of claim 6, further comprising the step of repeating the noise power calculations using successively revised transform window positions until the magnitude of the difference between the first noise power and second noise power is less than the threshold value.

8. The method of claim 1, further comprising the step of estimating a channel impulse response from a plurality of pilot symbols;
   wherein the step of selecting the plurality of transform window positions uses information from the estimated channel impulse response.

9. The method of claim 8, wherein the estimated channel impulse response determines a first path and a last path and wherein the plurality of transform window positions comprise a first transform window position with a start point coinciding with a start of a frequency domain symbol on the first path, a second transform window position with a start point coinciding with a start of a frequency domain symbol on the second path, a third transform window position with a start point coinciding with a path immediately preceding the first path; a fourth transform position with a start point preceding the first transform window position by a time corresponding to a guard interval and a fifth transform position with a start point preceding the second transform window position by a time corresponding to a guard interval.

10. An apparatus in a multiple sub-carrier digital communication receiver for optimizing a transform window position, the apparatus comprising a symbol synchronization block configured to calculate a noise power proportional to a symbol timing offset and associated with each of a plurality of transform window positions and to determine an optimized transform window position using the calculated noise powers and a transform block configured to transform a sequence of time domain samples into a sequence of frequency domain symbols, each frequency domain symbol including a plurality of complex values at a plurality of sub-carrier frequencies, using the optimized transform window position.

11. The apparatus of claim 10, wherein the symbol synchronization block is configured to compensate for inter-channel interference.

12. The apparatus of claim 11, wherein the symbol synchronization block is configured to compensate for inter-channel interference by reducing noise associated with Doppler spread.

13. The apparatus of claim 12, wherein the symbol synchronization block is configured to reduce noise associated with Doppler spread using a high-pass filter.

14. The apparatus of claim 10, wherein the symbol synchronization block is configured to accumulate noise power at each of the plurality of transform window positions over a plurality of frequency domain symbols.

15. The apparatus of claim 10, further comprising a coarse synchronization block configured to determine an initial transform window position and wherein the symbol synchronization block is configured to:

calculate a first noise power associated with a first transform window position associated with a first path;

calculate a second noise power associated with a second transform window position associated with a last path; and revise the initial transform window position by advancing a start point if the second noise power less the first noise power is greater than a threshold value and by retarding the start point if the second noise power less the first noise power is less than the negative of the threshold value.

16. The apparatus of claim 15, wherein the symbol synchronization block is configured to repeat the noise power calculations using successively revised transform window positions until the magnitude of the difference between the first noise power and second noise power is less than the threshold value.

17. The apparatus of claim 10, further comprising a channel impulse response estimation block configured to calculate a time domain channel impulse response estimate based on a plurality of pilot symbols and wherein the symbol synchronization block is configured to determine the plurality of transform window positions using information from the estimated channel impulse response.

18. The apparatus of claim 17, wherein the channel impulse response block is further configured to determine a first path and a last path and wherein the plurality of transform window positions comprise a first transform window position with a start point coinciding with a start of a frequency domain symbol on the first path, a second transform window position with a start point coinciding with a start of a frequency domain symbol on the second path, a third transform window position with a start point coinciding with a path immediately preceding the first path; a fourth transform position with a start point preceding the first transform window position by a time corresponding to a guard interval and a fifth transform position with a start point preceding the second transform window position by a time corresponding to a guard interval.

19. The apparatus of claim 10, wherein the symbol synchronization block comprises a plurality of parallel noise detector modules.

* * * * *